(12) United States Patent
Mitsunobu et al.

(10) Patent No.: US 11,634,790 B2
(45) Date of Patent: Apr. 25, 2023

(54) PLATED STEEL SHEET

(71) Applicant: NIPPON STEEL CORPORATION, Tokyo (JP)

(72) Inventors: Takuya Mitsunobu, Tokyo (JP); Jun Maki, Tokyo (JP); Hiroshi Takebayashi, Tokyo (JP); Takehiro Takahashi, Tokyo (JP); Kohei Tokuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 44 days.

(21) Appl. No.: 17/434,988

(22) PCT Filed: Apr. 16, 2020

(86) PCT No.: PCT/JP2020/016752
§ 371 (c)(1),
(2) Date: Aug. 30, 2021

(87) PCT Pub. No.: WO2020/213686
PCT Pub. Date: Oct. 22, 2020

(65) Prior Publication Data
US 2022/0145425 A1    May 12, 2022

(30) Foreign Application Priority Data

Apr. 19, 2019 (JP) .............................. JP2019-080286

(51) Int. Cl.
*C22C 18/04* (2006.01)
*C23C 2/06* (2006.01)
(Continued)

(52) U.S. Cl.
CPC ............. *C22C 18/04* (2013.01); *B32B 15/012* (2013.01); *B32B 15/013* (2013.01); *B32B 15/04* (2013.01);
(Continued)

(58) Field of Classification Search
CPC ........... C21D 9/46; C22C 18/04; C22C 18/00; C22C 38/00; C22C 38/02; C22C 38/04;
(Continued)

(56) References Cited

U.S. PATENT DOCUMENTS

2019/0390303 A1* 12/2019 Tokuda ..................... C23C 2/28
2020/0017937 A1   1/2020 Mitsunobu
2021/0198780 A1   7/2021 Mitsunobu

FOREIGN PATENT DOCUMENTS

EP         3279369 A1    2/2018
JP     2002-285311 A    10/2002
(Continued)

*Primary Examiner* — Michael E. La Villa
(74) *Attorney, Agent, or Firm* — Birch, Stewart, Kolasch & Birch, LLP

(57) ABSTRACT

A plated steel sheet includes: a steel sheet; and a plating layer that is formed on at least a part of a surface of the steel sheet, in which a chemical composition of the plating layer includes, by mass %, Al: more than 5.00% and 35.00% or less, Mg: 3.00% to 15.00%, Si: 0% to 2.00%, Ca: 0% to 2.00%, and a remainder of Zn and impurities, in which in a cross section of the plating layer in a thickness direction, the area ratio of a lamellar structure in which an (Al—Zn) phase and a $MgZn_2$ phase are arranged in layers is 10% to 90%, a lamellar spacing of the lamellar structure is 2.5 μm or less, and the area ratio of an (Al—Zn) dendrite is 35% or less.

19 Claims, 1 Drawing Sheet

(51) Int. Cl.
| | |
|---|---|
| *C23C 2/02* | (2006.01) |
| *B32B 15/01* | (2006.01) |
| *C23C 2/40* | (2006.01) |
| *C23C 28/02* | (2006.01) |
| *C22C 18/00* | (2006.01) |
| *C23C 28/00* | (2006.01) |
| *C23C 2/28* | (2006.01) |
| *C23C 2/26* | (2006.01) |
| *C23C 30/00* | (2006.01) |
| *B32B 15/04* | (2006.01) |
| *B32B 15/18* | (2006.01) |
| *C22C 21/00* | (2006.01) |
| *C23C 2/12* | (2006.01) |
| *C22C 38/06* | (2006.01) |
| *C21D 9/46* | (2006.01) |
| *C22C 38/02* | (2006.01) |
| *C22C 38/04* | (2006.01) |
| *C22C 38/00* | (2006.01) |

(52) U.S. Cl.
CPC ............ *B32B 15/043* (2013.01); *B32B 15/18* (2013.01); *C22C 18/00* (2013.01); *C22C 21/00* (2013.01); *C22C 38/06* (2013.01); *C23C 2/02* (2013.01); *C23C 2/06* (2013.01); *C23C 2/12* (2013.01); *C23C 2/26* (2013.01); *C23C 2/28* (2013.01); *C23C 2/285* (2013.01); *C23C 2/40* (2013.01); *C23C 28/02* (2013.01); *C23C 28/023* (2013.01); *C23C 28/025* (2013.01); *C23C 28/30* (2013.01); *C23C 28/32* (2013.01); *C23C 28/322* (2013.01); *C23C 28/3225* (2013.01); *C23C 28/345* (2013.01); *C23C 30/00* (2013.01); *C23C 30/005* (2013.01); *C21D 9/46* (2013.01); *C22C 38/00* (2013.01); *C22C 38/02* (2013.01); *C22C 38/04* (2013.01); *Y10T 428/1259* (2015.01); *Y10T 428/12611* (2015.01); *Y10T 428/12667* (2015.01); *Y10T 428/12757* (2015.01); *Y10T 428/12799* (2015.01); *Y10T 428/12958* (2015.01); *Y10T 428/12972* (2015.01); *Y10T 428/2495* (2015.01); *Y10T 428/24967* (2015.01); *Y10T 428/265* (2015.01)

(58) Field of Classification Search
CPC .......... C22C 38/06; C22C 21/00; C23C 2/02; C23C 2/06; C23C 2/26; C23C 2/28; C23C 2/40; C23C 2/12; C23C 2/285; C23C 28/02; C23C 28/023; C23C 28/025; C23C 28/30; C23C 28/32; C23C 28/3225; C23C 28/345; C23C 30/00; C23C 30/005; B32B 15/012; B32B 15/013; B32B 15/04; B32B 15/043; B32B 15/18; Y10T 428/12799; Y10T 428/12757; Y10T 428/12972; Y10T 428/12958; Y10T 428/12667; Y10T 428/1259; Y10T 428/12611; Y10T 428/2495; Y10T 428/24967; Y10T 428/265
See application file for complete search history.

(56) References Cited

FOREIGN PATENT DOCUMENTS

| | | | |
|---|---|---|---|
| JP | 2010-70810 A | 4/2010 | |
| JP | 4579715 B2 | 11/2010 | |
| JP | 2015-214747 A | 12/2015 | |
| JP | 6350780 B1 | 7/2018 | |
| WO | WO-2018139619 A1 * | 8/2018 | ........... B32B 15/013 |
| WO | WO 2018/169085 A1 | 9/2018 | |

* cited by examiner

PLATED STEEL SHEET

TECHNICAL FIELD OF THE INVENTION

The present invention relates to a plated steel sheet.

Priority is claimed on Japanese Patent Application No. 2019-080286, filed on Apr. 19, 2019, the content of which is incorporated herein by reference.

RELATED ART

Recently, as a vehicle structural member, a plated steel sheet is used from the viewpoint of corrosion resistance, and a hot-dip galvanized steel sheet such as a galvannealed steel sheet is mainly used in the Japanese market. The galvannealed steel sheet is a plated steel sheet in which weldability and post-coating corrosion resistance are improved by performing an alloying heat treatment on a steel sheet after hot-dip galvanizing and diffusing Fe from the steel sheet (base steel sheet) into a plating layer. However, further improvement of corrosion resistance such as post-coating corrosion resistance or red rust resistance is required for the hot-dip galvanized steel sheet.

Examples of a method of improving corrosion resistance of the hot-dip galvanized steel sheet include addition of Al to Zn. For example, in the building material field, as a high corrosion-resistant plated steel sheet, a hot-dip Al—Zn alloy plated steel sheet has been widely put into practice. A plating layer of the hot-dip Al—Zn alloy plated steel sheet is formed of: a dendritic α-(Zn,Al) phase that is initially crystallized from a molten state (Al primary crystal phase: α-(Zn,Al) phase crystallized as a primary phase in the Al—Zn binary phase diagram or the like; this phase is not necessarily an Al-rich phase and is crystallized as a solid solution of Zn and Al); and a structure (Zn/Al mixed phase structure) formed of a Zn phase and an Al phase that is formed in a gap of the dendritic Al primary crystal phase. The Al primary crystal phase is passivated, and the Zn/Al mixed phase structure has a higher Zn concentration than the Al primary crystal phase. Therefore, corrosion concentrates on the Zn/Al mixed phase structure. As a result, the corrosion propagates in a worm-eaten state in the Zn/Al mixed phase structure, and a corrosion propagation path is complicated. Therefore, the corrosion is not likely to easily reach the base steel sheet. As a result, the hot-dip Al—Zn alloy plated steel sheet has higher corrosion resistance than a hot-dip galvanized steel sheet where a plating layer has the same thickness.

When this hot-dip Al—Zn alloy plated steel sheet is used as a vehicle exterior panel, the plated steel sheet is provided to automobile manufacturers in a state where it is plated in a continuous hot-dip plating facility, is processed into a panel component shape, and subsequently undergoes automotive general coating of chemical conversion treatment, further electrodeposition coating, intermediate coating, and top coating in the automobile manufacturers. However, in the exterior panel formed of the hot-dip Al—Zn alloy plated steel sheet, when a coating film is damaged, due to the unique plating phase structure formed of the two phases including the Al primary crystal phase and the Zn/Al mixed phase structure, preferential dissolution of Zn (selective corrosion of the Zn/Al mixed phase structure) initiates from a damaged part at an interface between the coating film and the plating. This corrosion propagates deep into a coating defect-free part, severe coating blistering occurs, and thus there is a problem in that sufficient corrosion resistance (post-coating corrosion resistance) cannot be secured.

In order to improve corrosion resistance, addition of an element such as Mg to the Al—Zn plating is also considered. However, it is presumed that, even when Mg is added, an Al primary crystal phase including a passivation film is still formed in the hot-dip Al—Zn alloy plated steel sheet. Therefore, the problem with respect to corrosion resistance caused when the coating film is damaged after coating (post-coating corrosion resistance) is not solved.

In order to solve this problem, Patent Document 1 discloses a hot-dip Zn-based plated steel sheet having excellent post-coating corrosion resistance. Patent Document 1 discloses that a plating layer includes Zn, Al, Mg, and Si, and when a total area ratio of a lamellar structure in which a layered Zn phase and a layered Al phase are alternately arranged in the plating layer is 5% or more, coating blistering in the coated state is suppressed.

However, in Patent Document 1, post-coating corrosion resistance is improved to some extent. However, the effect is limited, and sufficient post-coating corrosion resistance cannot be secured. In addition, in the technique disclosed in Patent Document 1, it is necessary to perform a complex thermal history process for microstructure control, and there is a problem in that manufacturing costs increase.

Patent Document 2 discloses a hot-dip Al—Zn based plated steel sheet including a plating layer, in which the plating layer includes, by mass %, Al: 25% to 90% and Sn: 0.01% to 10% and further includes 0.01% to 10% of one kind or more selected from the group consisting of Mg, Ca, and Sr. Patent Document 2 discloses that, since an Al oxide film formed around the α-Al phase is fractured by Sn and the solubility of the α-Al phase increases, uniform corrosion of the plating layer in which the α-Al phase and a Zn-rich phase are dissolved occurs. As a result, selective corrosion of the Zn-rich phase can be suppressed, and post-coating corrosion resistance is improved.

However, the plated steel sheet disclosed in Patent Document 2 has a disadvantageous effect in that adhesion with an electrodeposition film for a vehicle is poor. In addition, in Patent Document 2, Sn addition is essential. Therefore, alloy costs increase, and there is a problem in that it is difficult to manage a plating bath.

In addition, Patent Document 3 discloses a chemical conversion steel sheet including, a hot-dip Zn—Al—Mg alloy plated steel sheet where a proportion of [Al/Zn/$Zn_2$Mg ternary eutectic structure] in an outermost surface of a plating layer is 60 area % or more is a substrate, in which a surface of the plating layer is covered with a chemical conversion film. However, in Patent Document 3, corrosion resistance is improved by controlling a configuration of the chemical conversion film. In addition, in order to improve the reactivity with the chemical conversion film, the Al/Zn/$Zn_2$Mg ternary eutectic structure is set as a primary phase in the plating layer. Therefore, when a typical chemical conversion treatment is performed, chemical convertibility is improved, but the microstructure control of the plating layer is not sufficient. Therefore, it is presumed that post-coating corrosion resistance required for a vehicle cannot be sufficiently obtained.

Accordingly, in the related art, a hot-dip zinc-plated steel sheet that can secure sufficient post-coating corrosion resistance required for a recent vehicle structural member is not disclosed.

PRIOR ART DOCUMENT

Patent Document

[Patent Document 1] Japanese Patent No. 6350780
[Patent Document 2] Japanese Unexamined Patent Application, First Publication No. 2015-214747
[Patent Document 3] Japanese Patent No. 4579715

DISCLOSURE OF THE INVENTION

Problems to be Solved by the Invention

The present invention has been made in consideration of the above-described problems. An object of the present invention is to provide a plated steel sheet having excellent post-coating corrosion resistance on the premise of a plated steel sheet is a hot-dip zinc-plated steel sheet.

Means for Solving the Problem

The present inventors conducted an investigation on post-coating corrosion resistance of a hot-dip zinc-based plated steel sheet containing Al and Mg. As a result, it was found that post-coating corrosion resistance can be improved by adjusting the Al content and the Mg content in the plating layer to be in appropriate ranges, controlling the solidification of the plating layer, and controlling configurations and area ratios of phases in the plating layer.

The present invention has been made based on the above-described findings. The summary of the present invention is as follows.

(1) According to one aspect of the present invention, a plated steel sheet includes: a steel sheet; and a plating layer that is formed on at least a part of a surface of the steel sheet, in which a chemical composition of the plating layer includes, by mass %, Al: more than 5.00% and 35.00% or less, Mg: 3.00% to 15.00%, Si: 0% to 2.00%, Ca: 0% to 2.00%, and a remainder of Zn and impurities, in which in a cross section of the plating layer in a thickness direction, an area ratio of a lamellar structure in which an (Al—Zn) phase and a $MgZn_2$ phase are arranged in layers is 10% to 90%, a lamellar spacing of the lamellar structure is 2.5 μm or less, and an area ratio of an (Al—Zn) dendrite is 35% or less.

(2) In the plated steel sheet according to (1), the chemical composition of the plating layer may include, by mass %, one or more kinds of Al: 11.00% to 30.00%, Mg: 3.00% to 11.00%, and Ca: 0.03% to 1.00%.

(3) The plated steel sheet according to (1) or (2) may further include, by mass %, Sb: 0.50% or less, Pb: 0.50% or less, Cu: 1.00% or less, Sn: 1.00% or less, Ti: 1.00% or less, Sr: 0.50% or less, Ni: 1.00% or less, Mn: 1.00% or less, and Fe: 2.00% or less.

(4) In the plated steel sheet according to any one of (1) to (3), in the cross section of the plating layer in the thickness direction, the area ratio of the lamellar structure may be 50% to 90%.

(5) In the plated steel sheet according to (4), in the cross section of the plating layer in the thickness direction, the area ratio of the lamellar structure may be 70% to 90%.

(6) The plated steel sheet according to any one of (1) to (5) may further include an alloy layer that is provided between the plating layer and the steel sheet and is formed of an Al—Fe-based intermetallic compound having an average thickness of 0.05 μm to 3.0 μm.

(7) In the plated steel sheet according to any one of (1) to (5), the steel sheet may include an internally oxidized layer that is provided in a surface layer area on an interface side between the steel sheet and the plating layer.

(8) In the plated steel sheet according to (6), the steel sheet may include an internally oxidized layer that is provided in a surface layer area on an interface side between the steel sheet and the alloy layer.

Effects of the Invention

According to the aspect of the present invention, a plated steel sheet having excellent post-coating corrosion resistance can be obtained. The plated steel sheet according to the present invention is suitable for a vehicle structural member. Therefore, the present invention improves collision safety of a plated steel sheet for a vehicle structural member and increases the lifetime thereof, thereby contributing to the development of the industry.

EMBODIMENTS OF THE INVENTION

Figure 1:
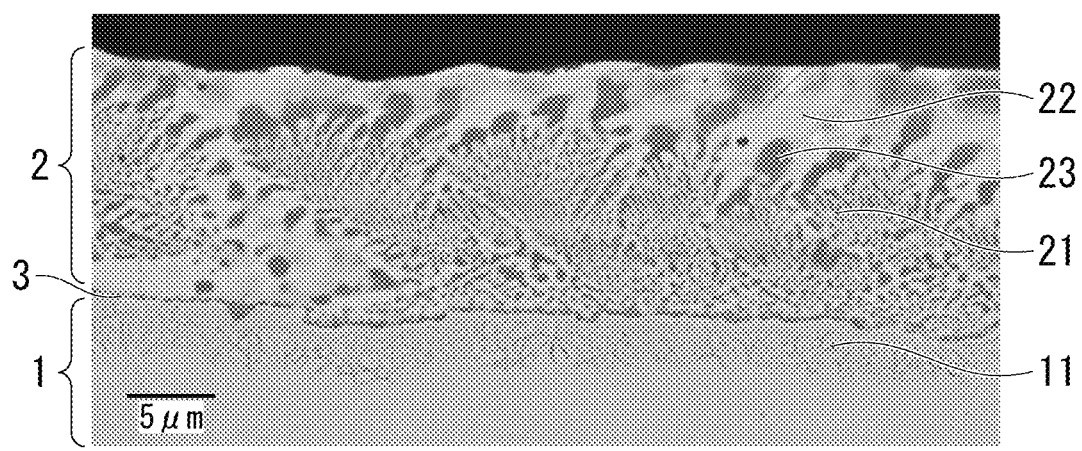
FIG. 1 is a diagram showing an example of a plating layer in a plated steel sheet (No. 15 of Example) according to an embodiment.

As shown in FIG. 1, a plated steel sheet according to an embodiment of the present invention (the plated steel sheet according to the embodiment) include: a steel sheet 1; and a plating layer 2 that is formed on at least a part of a surface of the steel sheet 1. In addition, in the plated steel sheet according to the embodiment, the chemical composition of the plating layer 2 includes, by mass %, Al: more than 5.00% and 35.00% or less, Mg: 3.00% to 15.00%, Si: 0% to 2.00%, and Ca: 0% to 2.00%, and optionally further includes one or more kinds of Sb: 0.50% or less, Pb: 0.50% or less, Cu: 1.00% or less, Sn: 1.00% or less, Ti: 1.00% or less, Sr: 0.50% or less, Ni: 1.00% or less, Mn: 1.00% or less, Fe: 2.00% or less, and a remainder of Zn and impurities. In addition, in the plated steel sheet according to the embodiment, in a cross section of the plating layer 2 in a thickness direction, the area ratio of a lamellar structure 21 in which an (Al—Zn) phase and a $MgZn_2$ phase are arranged in layers is 10% to 90%, a lamellar spacing of the lamellar structure 21 is 2.5 μm or less, and the area ratio of an (Al—Zn) dendrite 23 is 35% or less.

The plated steel sheet according to the embodiment may include an alloy layer 3 that is provided between the steel sheet 1 and the plating layer 2 and is formed of an intermetallic compound containing Fe and Al.

<Steel Sheet>

In the plated steel sheet according to the embodiment, the plating layer 2 is important, and the kind of the steel sheet 1 is not particularly limited. The kind of the steel sheet 1 may be determined depending on the product to be applied and the strength, sheet thickness, and the like that are required. For example, a hot-rolled steel sheet defined in JIS G3193: 2008 or a cold-rolled steel sheet defined in JIS G3141: 2017 can be used.

It is preferable that the steel sheet 1 includes an internally oxidized layer 11 that is provided in a surface layer area on an interface side between the steel sheet 1 and the plating layer 2 (when the alloy layer 3 described is formed between the steel sheet 1 and the plating layer 2, in a surface layer area on an interface side between the steel sheet 1 and the alloy layer 3).

The internally oxidized layer 11 is formed by annealing the steel sheet before plating in a predetermined atmosphere. By causing the internally oxidized layer 11 to be present in the steel sheet 1, when hot-dip plating is performed on the steel sheet 1, the lamellar structure 21 in which the (Al—Zn) phase and the $MgZn_2$ phase are arranged in layers is likely to be formed in the plating layer 2. In order to obtain the effect, the thickness of the internally oxidized layer 11 is preferably 0.10 μm to 8.00 μm.

[Alloy Layer]

In the plated steel sheet according to the embodiment, the alloy layer 3 may be formed between the steel sheet 1 and the plating layer 2. By forming the alloy layer 3, adhesion between the steel sheet 1 and the plating layer 2 is improved, which is preferable. In order to obtain the effect, the average thickness of the alloy layer 3 is preferably 0.05 μm to 3.00 μm.

The alloy layer is formed of the Al—Fe-based intermetallic compound (for example, when the Al—Fe alloy layer or the plating layer 2 includes Si, an Al—Fe—Si alloy layer).

Whether or not the alloy layer 3 is present and the thickness of the alloy layer 3 can be obtained by measuring the thickness of the Al—Fe-based intermetallic compound from an element distribution image obtained by EDS spectroscopy.

<Plating Layer>

In the plated steel sheet according to the embodiment, the plating layer 2 is provided on at least a part of the surface of the steel sheet 1. The plating layer 2 may be formed on a single surface or both surfaces of the steel sheet 1.

The adhesion amount of the plating layer is preferably 15 g/m$^2$ to 250 g/m$^2$.

[Chemical Composition]

The chemical composition of the plating layer 2 in the plated steel sheet according to the embodiment will be described.

Al: more than 5.00% and 35.00% or less

Al is an element that is effective for securing post-coating corrosion resistance in the plating layer 2 containing aluminum (Al), zinc (Zn), and magnesium (Mg). In addition, Al is an element necessary to form the lamellar structure 21 in the plating layer 2 of the plated steel sheet according to the embodiment. In addition, Al is an element that contributes to the formation of the alloy layer 3 (Al—Fe alloy layer) and is effective for securing plating adhesion. In order to sufficiently obtain the effects, the Al content is more than 5.00%. The Al content is preferably 11.00% or more.

On the other hand, when the Al content is more than 35.00%, the area ratio of the (Al—Zn) dendrite increases, and the post-coating corrosion resistance and the corrosion resistance of a cut end surface of the plating layer decrease. Therefore, the Al content is 35.00% or less. The Al content is preferably 30.00% or less.

Mg: 3.00% to 15.00%

Mg is an element having an effect of improving the post-coating corrosion resistance of the plating layer 2. In addition, Mg is an element necessary to form the lamellar structure 21 in the plating layer 2 of the plated steel sheet according to the embodiment. In order to sufficiently obtain the effects, the Mg content is preferably 3.00% or more.

On the other hand, when the Mg content is more than 15.00%, the lamellar structure 21 is not sufficiently formed, post-coating corrosion resistance deteriorates, and the workability of the plating layer deteriorates. In addition, there is a manufacturing problem in that, for example, the amount of dross formed in a plating bath increases. Therefore, the Mg content is 15.00% or less. The Mg content is preferably 11.00% or less.

Si: 0% to 2.00%

Si is an element that forms a compound together with Mg and contributes to improvement of post-coating corrosion resistance. In addition, Si is an element having an effect of improving adhesion between the steel sheet 1 and the plating layer 2 by suppressing the formation of an excessively thick alloy layer between the steel sheet 1 and the plating layer 2 when the plating layer 2 is formed on the steel sheet 1. Therefore, Si may be contained. In order to obtain the effects, the Si content is preferably 0.10% or more. The Si content is more preferably 0.20% or more.

On the other hand, when the Si content is more than 2.00%, an excess amount of Si is crystallized in the plating layer, the lamellar structure 21 is not sufficiently formed, and post-coating corrosion resistance deteriorates. In addition, the workability of the plating layer decreases. Accordingly, the Si content is 2.00% or less. The Si content is more preferably 1.50% or less. Si does not need to be contained, and the lower limit thereof is 0%.

Ca: 0% to 2.00%

When Ca is contained in the plating layer, the amount of dross that is more likely to be formed during a plating operation along with an increase in Mg content decreases, and plating manufacturability is improved. Therefore, Ca may be contained. Ca does not need to be contained, and the lower limit thereof is 0%. In order to obtain the effect, the Ca content is preferably 0.03% or more and more preferably 0.10% or more.

On the other hand, when the Ca content is high, the lamellar structure 21 is not sufficiently formed, the area ratio of Ca-based intermetallic compounds such as a $CaZn_{11}$ phase and the like formed as other intermetallic compound phases is 10% or more, and post-coating corrosion resistance deteriorates. In addition, the post-coating corrosion resistance of a flat portion of the plating layer itself tends to deteriorate, and the corrosion resistance of the vicinity of a welded part may also deteriorate. Therefore, when Ca is contained, the Ca content is 2.00% or less. The Ca content is preferably 1.00% or less.

The chemical composition of the plating layer 2 in the plated steel sheet according to the embodiment basically includes the above-described chemical composition and a remainder of Zn and impurities. The amount of the impurities is preferably 5.0% or less and more preferably 3.0% or less.

However, in the embodiment, the plating layer 2 in the plated steel sheet according to the embodiment may further include, for example, Sb, Pb, Cu, Sn, Ti, Sr, Ni, Mn, and Fe in the following ranges instead of a part of Zn. Since these elements do not need to be contained, the lower limit of the amount of each of the elements is 0%. In addition, even when these elements are contained at an impurity level, there are substantially no effects on the characteristics of the plating layer.

Sb: 0.50% or less
Sr: 0.50% or less
Pb: 0.50% or less

Even when Sr, Sb, and Pb are contained in the plating layer 2, the external appearance of the plating layer 2 changes, spangle is formed, and improvement of metallic gloss is verified. However, when the amount of each of these elements is more than 0.50%, various intermetallic compound phases are formed, and workability and corrosion resistance deteriorate. In addition, when the amount of each of these elements is excessive, the viscosity of the plating bath increases, it is difficult to prepare the plating bath, and a plated steel sheet having excellent plating characteristics cannot be manufactured. Therefore, it is preferable that the Sr content is 0.50% or less, the Sb content is 0.50% or less, and the Pb content is 0.50% or less.

Sn: 1.00% or less,

Sn is an element that increases a dissolution rate of Mg in the plating layer 2 containing Zn, Al, and Mg. When the dissolution rate of Mg increases, flat portion corrosion resistance deteriorates. Therefore, the Sn content is preferably 1.00% or less.

Cu: 1.00% or less
Ti: 1.00% or less
Ni: 1.00% or less
Mn: 1.00% or less

These elements are elements contributing to improvement of corrosion resistance. On the other hand, when the amount of each of these elements is excessive, the viscosity of the plating bath increases, it is difficult to prepare the plating bath, and a plated steel sheet having excellent plating characteristics cannot be manufactured. Therefore, the amount of each of the elements is preferably 1.00% or less.

Fe: 2.00% or less

Fe is mixed into the plating layer as an impurity when the plating layer is manufactured. Although about 2.00% of Fe may be contained, when the Fe content is in this range, there is little adverse effect on characteristics of the plated steel sheet according to the embodiment. Therefore, the Fe content is preferably 2.00% or less. The Fe content is more preferably 1.50% or less and still more preferably 1.00% or less.

The chemical composition of the plating layer 2 is measured using the following method.

First, an acid solution is obtained by peeling and dissolving the plating layer with an acid containing an inhibitor that suppresses the corrosion of the base metal (steel). Next, by measuring the obtained acid solution by ICP analysis, the chemical composition of the plating layer 2 can be obtained (when the alloy layer 3 is formed between the plating layer 2 and the steel sheet 1, the total chemical composition of the plating layer 2 and the alloy layer 3 is obtained. However, since the alloy layer 3 is thin, there is little influence). The kind of the acid is not particularly limited as long as it is an acid that can dissolve the plating layer. The chemical composition is measured as an average chemical composition.

When it is desired to obtain each of the chemical compositions of the alloy layer 3 and the plating layer 2, a calibration curve of quantitative analysis of each element is obtained by glow discharge spectrometry (GDS). Next, the chemical composition of the plating layer as a target in a depth direction may be measured. For example, a plurality of samples of 30 mm×30 mm are collected from the prepared plated steel sheet as samples for GDS. Argon ion sputtering is performed from the surface layer of the plating layer to obtain an element intensity plot in the depth direction. Further, by preparing a standard sample such as each element pure metal sheet to obtain an element intensity plot in advance, the concentration can be converted from the intensity plot. When GDS is used for analysis of the chemical composition, it is preferable that the analysis area is φ4 mm or more, the measurement is performed 10 or more times, and an average value of a component at each of positions is adopted. The sputter rate is preferably in a range of about 0.04 μm/sec to 0.10 μm/sec.

[Structures (Phases) in Plating Layer]

As shown in FIG. 1, the plating layer 2 in the plated steel sheet according to the embodiment includes the lamellar structure 21 in which the (Al—Zn) phase and the MgZn$_2$ phase are arranged in layers, in which the area ratio of the lamellar structure 21 is 10% to 90%. In addition, in the plating layer 2 of the plated steel sheet according to the embodiment, the area ratio of the (Al—Zn) dendrite 23 is 35% or less.

Figure 2:
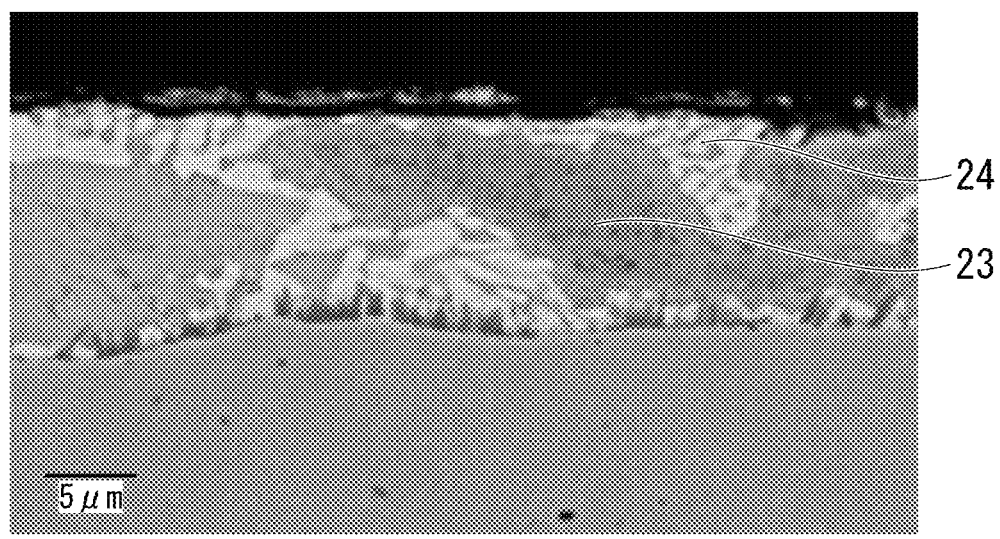
FIG. 2 is a diagram showing an example of a plating layer in a plated steel sheet in the related art.

In general, when the steel sheet dipped in the plating bath containing Zn, Mg, and Al is cooled, as shown in FIG. 2, the (Al—Zn) dendrite 23 as a primary phase and the Zn/Al/MgZn$_2$ ternary eutectic structure 24 are formed in the plating layer. The (Al—Zn) dendrite 23 has low corrosion resistance. Therefore, even in a case where the steel sheet is coated, for example, when defects occur in the coating film, corrosion propagates into the plating layer and coating blistering occurs.

On the other hand, the lamellar structure 21 in which the (Al—Zn) phase and the MgZn$_2$ phase are arranged in layers has high corrosion resistance. Therefore, even when defects occur in the coating film, the propagation of corrosion in the plating layer is suppressed.

That is, in the plating layer 2 of the plated steel sheet according to the embodiment, the area ratio of the lamellar structure 21 in which the (Al—Zn) phase and the MgZn$_2$ phase are arranged in layers in the plating layer and contributes to improvement of post-coating corrosion resistance, is 10% or more. The area ratio of the lamellar structure is preferably 50% or more and more preferably 70% or more. The lamellar structure 21 has an effect of improving not only post-coating corrosion resistance but also LME resistance. On the other hand, under the precondition of the above-described chemical composition, it is difficult to adjust the area ratio of the lamellar structure 21 to be more than 90% from the viewpoint of industrial application. Therefore, the area ratio of the lamellar structure is 90% or less.

In addition, in the plating layer 2 of the plated steel sheet according to the embodiment, the area ratio of the (Al—Zn) dendrite 23 that deteriorates post-coating corrosion resistance is 35% or less. The area ratio of the (Al—Zn) dendrite 23 is preferably as low as possible and may be 0%.

In the lamellar structure 21, the (Al—Zn) phase and the MgZn$_2$ phase are arranged in layers. As the lamellar spacing of the lamellar structure 21 decreases, the effect of improving post-coating corrosion resistance and LME resistance increases. The lamellar spacing for obtaining sufficient performance is 2.5 μm or less (2500 nm or less) and preferably 500 nm or less. This lamellar structure is also called "feathery structure".

The Zn/Al/MgZn$_2$ ternary eutectic structure includes, by area %, Zn phase: 45% to 60%, MgZn$_2$ phase: 35% to 45%, and Al phase: 3% to 10%. On the other hand, the fractions of the respective phases in the lamellar structure 21 include, by area %, Zn phase: 0% to 10%, MgZn$_2$ phase: 40% to 65%, and Al phase: 30% to 45%.

The plating layer 2 in the plated steel sheet according to the embodiment may include a massive MgZn$_2$ phase, the Zn/Al/MgZn$_2$ ternary eutectic structure 24, and other intermetallic compounds as phases other than the lamellar structure 21 and the (Al—Zn) dendrite 23 described above. The amount of the remainder is preferably 50% or less and more preferably 30% or less.

The massive MgZn$_2$ phase contributes to improvement of post-coating corrosion resistance. In order to sufficiently obtain the effect, the area ratio of the massive MgZn$_2$ phase is preferably 5% or more. On the other hand, from the viewpoint of workability, the area ratio of the massive MgZn$_2$ phase is preferably 40% or less.

The area ratio of the Zn/Al/MgZn$_2$ ternary eutectic structure 24 is preferably 45% or less. When the area ratio of the Zn/Al/MgZn$_2$ ternary eutectic structure 24 is more than 45%, post-coating corrosion resistance may deteriorate.

In addition, the MgSi$_2$ phase or other intermetallic compounds deteriorate post-coating corrosion resistance. Therefore, the area ratio of each of the MgSi$_2$ phase or other intermetallic compounds is preferably 10% or less. The total area ratio is more preferably 10% or less. Examples of the other intermetallic compound phases include a CaZn$_{11}$ phase, an Al$_2$CaSi$_2$ phase, and an Al$_2$CaZn$_2$ phase.

The structures of the plating layer (the area ratios of the respective phases, the lamellar spacing) are measured using the following method.

A sample having a size of 25 mm in a direction perpendicular to a rolling direction and 15 mm in the rolling direction is collected from the plated steel sheet according to the embodiment, and this sample is embedded in a resin and polished such that a thickness direction of the plating layer is an observed section. Next, a cross sectional SEM image of the plating layer and an element distribution image by EDS are obtained. Regarding the area ratios of the lamellar structure, the massive $MgZn_2$ phase, the $Zn/Al/MgZn_2$ ternary eutectic structure, the (Al—Zn) dendrite, the other intermetallic compounds in the plating layer, one visual field is imaged from each of five samples having different cross sectional EDS mapping images of the plating layers, that is, five visual fields (magnification: 1500-fold, 60 μm×50 μm/One Field) in total are imaged, and the area ratio of each of the structures is measured from the image.

At this time, when the lamellar spacing between an a phase formed of Al and Zn and a $MgZn_2$ phase is 2.5 μm or less, this structure is determined as the lamellar structure. When the minor axis is more than 2.5 μm, this structure is determined as the massive $MgZn_2$ phase. A lamellar structure of a Zn phase, an a phase, and $MgZn_2$ having a lamellar spacing of 2.5 μm or less is determined as the $Zn/Al/MgZn_2$ ternary eutectic structure. When the minor axis is 2.5 μm or more, the structure is determined as the (Al—Zn) dendrite. When 10% or more of metals other than Zn, Al, Mg, and Si are contained in the phase, the structure is determined as the other intermetallic compound.

In addition, the lamellar spacing of the lamellar structure is obtained by measuring the spacing between a phase having the smallest area ratio and a phase adjacent thereto among phases forming the lamellar structure in the SEM observation and calculating the average value of spacings measured at 10 positions.

In addition, the area ratio of the lamellar structure and the area ratios of the Zn phase, the $MgZn_2$ phase, and the Al phase forming the $Zn/Al/MgZn_2$ ternary eutectic structure can be obtained using a method in which a region where the corresponding structure is present on the cross sectional SEM image is surrounded by a line using image processing software or the like to calculate the area of the region surrounded by the line.

<Manufacturing Method>

Next, a preferable method for manufacturing the plated steel sheet according to the embodiment will be described. As long as the plated steel sheet according to the embodiment has the above-described characteristics, the effects can be obtained irrespective of the manufacturing method. However, with the following method, the steel sheet can be stably manufactured, which is preferable.

Specifically, the steel sheet according to the embodiment can be manufactured with a manufacturing method including the following processes (I) to (IV).

(I) An annealing process of performing reduction annealing to the steel sheet (II) A plating process of dipping the steel sheet in a plating bath containing Al, Mg, and Zn to prepare a plating base sheet (III) A controlled cooling process of cooling the plating base sheet to a cooling stop temperature which is range from (Al—Zn/$MgZn_2$ binary eutectic temperature −30°) C. to (Al—Zn/$MgZn_2$ binary eutectic temperature−10°) C. at an average cooling rate of 15° C./sec or faster (IV) A slow cooling process of cooling the plated steel sheet to 335° C. or lower after the controlled cooling process such that an average cooling rate is 5° C./sec or slower

[Annealing Process]

In the annealing process, a steel sheet (hot-rolled steel sheet or cold-rolled steel sheet) obtained using a well-known method is annealed before the plating process. Annealing conditions may be well-known conditions. For example, the steel sheet is heated to 750° C. to 900° C. in a 5% $H_2$—$N_2$ gas atmosphere having a dew point−10° C. or higher and is held at this state for 30 seconds to 240 seconds.

However, in order to form an internally oxidized layer in the steel sheet, it is preferable that the annealing temperature is 800° C. to 870° C. and the annealing time is 60 seconds to 130 seconds. When the internally oxidized layer is formed, the formation of the lamellar structure 21 is promoted by controlled cooling and slow cooling.

[Plating Process]

In the plating process, in the middle of process of temperature decrease after annealing, the steel sheet 1 is dipped in the plating bath to form the plating layer 2. As a result, the plating base sheet is formed.

It is preferable that the plating bath includes Al: more than 5.00% and 35.00% or less, Mg: 3.00% to 15.00%, Si: 0% to 2.00%, Ca: 0% to 2.00%, and a remainder of Zn and impurities. The composition of the plating bath is substantially the same as the composition of the plating layer to be formed.

[Controlled Cooling Process]

In the controlled cooling process, the plating adhesion amount of the plating base sheet after the plating process (the plating base sheet that is pulled from the plating bath) is adjusted by wiping gas such as $N_2$ and is cooled. During cooling, the plating base sheet is cooled to a cooling stop temperature which is range from (Al—Zn/$MgZn_2$ binary eutectic temperature−30°) C. to (Al—Zn/$MgZn_2$ binary eutectic temperature −10°) C. such that the average cooling rate is 15° C./sec or faster.

By performing cooling under the above-described conditions, formation of the (Al—Zn) dendrite is suppressed, a product nucleus of the lamellar structure is formed, and the lamellar structure is formed in the next slow cooling process.

When the average cooling rate is slower than 15° C./sec, the (Al—Zn) phase and the $MgZn_2$ phase do not form the lamellar structure, a large amount of the (Al—Zn) dendrite is formed, and post-coating corrosion resistance deteriorates.

In addition, when the cooling stop temperature is lower than (Al—Zn/$MgZn_2$ binary eutectic temperature−30°) C., it is difficult to a sufficient amount of the lamellar structure in the next slow cooling process. In addition, when the cooling stop temperature is higher than (Al—Zn/$MgZn_2$ binary eutectic temperature−10°) C., the α phase and the $MgZn_2$ phase do not satisfy conditions of eutectic solidification, and thus a large amount of an (Al—Mg) dendrite is formed.

The upper limit of the average cooling rate does not need to be limited but may be 40° C./sec or slower due to restrictions in facility or the like.

The Al—Zn/$MgZn_2$ binary eutectic temperature can be obtained from a projection of liquidus of Zn—Al—Mg ternary phase diagram.

[Slow Cooling Process]

In the slow cooling process, the plating base sheet after the completion of controlled cooling is cooled to 335° C. or lower such that the average cooling rate is 5° C./sec or slower.

In this slow cooling process, the product nucleus of the lamellar structure formed in the controlled cooling process grows, and a predetermined area ratio of the lamellar structure is obtained.

When the average cooling rate during cooling to 335° C. or lower is faster than 5° C./sec, the nucleus growth is insufficient, and the area ratio of the lamellar structure is insufficient.

With the above-described manufacturing method, the plated steel sheet according to the embodiment can be obtained.

EXAMPLES

Example 1

As a steel sheet to be subjected to annealing and plating, a cold-rolled steel sheet (0.2% C-2.0% Si-2.3% Mn) having a sheet thickness of 1.6 mm was prepared.

This steel sheet was cut into 100 mm×200 mmm, and subsequently annealing and hot-dip plating were performed using a batch type hot dip plating test apparatus.

During annealing, in a furnace having an oxygen concentration of 20 ppm or lower, annealing was performed at 860° C. for 120 seconds in an atmosphere formed of gas containing 5% of $H_2$ gas and a remainder of $N_2$ and having a dew point of 0° C.

After annealing, the steel sheet was air-cooled with $N_2$ gas such that the steel sheet temperature reached the bath temperature+20° C., and was dipped in the plating bath having a bath temperature shown in Table 1 for about 3 seconds. The composition of the plating bath and the composition of the formed plating layer are as shown in Table 1.

The plating base sheet on which the plating layer was formed was cooled to room temperature by controlled cooling and slow cooling under conditions shown in Table 1.

The temperature of the steel sheet was measured using a thermocouple spot-welded to a central part of the plating base sheet.

Regarding the obtained plated steel sheet, the area ratios of the respective phases in the plating layer and the lamellar spacing of the lamellar structure were measured using the following method.

A sample having a size of 25 mm in a direction perpendicular to a rolling direction and 15 mm in the rolling direction was collected from the obtained plated steel sheet, and this sample was embedded in a resin and polished such that a thickness direction of the plating layer was an observed section. Next, a cross sectional SEM image of the plating layer and an element distribution image by EDS were obtained. Regarding the area ratios of the lamellar structure, the massive $MgZn_2$ phase, the $Zn/Al/MgZn_2$ ternary eutectic structure, the (Al—Zn) dendrite, the other intermetallic compounds in the plating layer, one visual field was imaged from each of five samples having different cross sectional EDS mapping images of the plating layers, that is, five visual fields (magnification: 1500-fold, 60 μm×50 μm/One Field) in total were imaged, and the area ratio of each of the structures was measured by image analysis.

In addition, the lamellar spacing of the lamellar structure was obtained by measuring the spacing between a phase having the smallest area ratio and a phase adjacent thereto among phases forming the lamellar structure in the SEM observation and calculating the average value of spacings measured at 10 positions.

In addition, when the alloy layer was formed between the steel sheet and the plating layer, the thickness of the alloy layer was obtained by measuring the thickness of the Al—Fe-based intermetallic compound from an element distribution image obtained by EDS spectroscopy.

FIG. 1 is a SEM image (BSE image) of No. 15 in Tables 1 and 2. The plating layer included the lamellar structure (the feathery structure-21 in FIG. 1) and the massive $MgZn_2$ phase (22 in FIG. 1), in which the alloy layer (3 in FIG. 1) was formed at an interface between the plating layer and the steel sheet. Further, the internally oxidized layer (11 in FIG. 1) was formed in the surface layer area of the steel sheet. In addition, the lamellar structure included, by area %, Zn phase: 0% to 10%, $MgZn_2$ phase: 40% to 65%, and Al phase: 30% to 45%.

In addition, the obtained plated steel sheet, a commercially available galvanized steel sheet (No. 52), an alloyed galvanized steel sheet (No. 53), and an electrogalvanized steel sheet (No. 54) were evaluated for post-coating corrosion resistance.

Specifically, a sample of 50 mm×100 mm was collected from the plated steel sheet, and a zinc phosphating (SD5350 system, manufactured by Nippon Paint Industrial Coatings Co., Ltd.) was performed thereon. Next, an electrodeposition coating (PN110 POWERNICS (registered tradename) GREY, manufactured by Nippon Paint Industrial Coatings Co., Ltd.) having a thickness of 20 μm was formed and was baked at a baking temperature of 150° C. for 20 minutes. Next, crosscut damages (40×√2, two damages) reaching the steel sheet (base metal) were formed. The painted plated steel sheet was provided for a combined cyclic corrosion test according to JASO (M609-91), the maximum blister width was measured at eight positions around the crosscuts, and the average value thereof was obtained to evaluate post-coating corrosion resistance.

When the number of cycles of JASO (M609-91) was 180, a case where the blister width from the crosscut damage was less than 1.5 mm was evaluated as "AA", a case where the blister width from the crosscut damage was 1.5 mm to 2.5 mm was evaluated as "A", and a case where the blister width from the crosscut damage was more than 2.5 mm was evaluated as "B".

In addition, not only coating blistering but also red rust resistance were evaluated according to JASO (M609-91). A case where red rust occurred from the crosscut damages when the number of cycles was 240 was evaluated as "AA", a case where red rust occurred from the crosscut damages when the number of cycles was 120 or more and less than 240 was evaluated as "A", a case where red rust occurred from the crosscut damages when the number of cycles was 60 or more and less than 120 was evaluated as "B", and a case where red rust occurred from the crosscut damages when the number of cycles was less than 60 was evaluated as "C".

When both coating blistering and red rust resistance were evaluated as A or AA, post-coating corrosion resistance was determined to be excellent.

The results are shown in Table 2.

TABLE 1

| | | | Plating Layer Composition (mass %) | | | | | | Controlled Cooling | | | Slow Cooling |
|---|---|---|---|---|---|---|---|---|---|---|---|---|
| | | Plating Bath Temperature (° C.) | Zn | Al | Mg | Ca | Si | Other Elements | Average Cooling Rate from Bath Temperature to Controlled Cooling Stop Temperature (° C./sec) | Binary Eutectic Temperature (° C.) | Controlled Cooling Stop Temperature | Average Cooling Rate from Controlled Cooling Stop Temperature to 335° C. (° C./sec) |
| Classification | No. | | | | | | | Main Element (Content %) | Total % | | | |
| Comparative Example | 1 | 440 | 91.6 | 5.00 | 3.00 | 0.20 | 0.20 | — | 0.00 | 15 | 355 | 335 | 5 |

TABLE 1-continued

| | | Plating Bath Temperature (° C.) | Plating Layer Composition (mass %) | | | | | Other Elements | | Controlled Cooling | | | Slow Cooling |
|---|---|---|---|---|---|---|---|---|---|---|---|---|---|
| | | | | | | | | Main Element (Content %) | Total % | Average Cooling Rate from Bath Temperature to Controlled Cooling Stop Temperature (° C./sec) | Binary Eutectic Temperature (° C.) | Controlled Cooling Stop Temperature | Average Cooling Rate from Controlled Cooling Stop Temperature to 335° C. (° C./sec) |
| Classification | No. | | Zn | Al | Mg | Ca | Si | | | | | | |
| Comparative Example | 2 | 455 | 91.6 | 6.00 | 2.00 | 0.20 | 0.20 | — | 0.00 | 15 | 430 | 410 | 5 |
| Example | 3 | 430 | 91.0 | 6.00 | 3.00 | 0.00 | 0.00 | — | 0.00 | 15 | 380 | 360 | 2 |
| Example | 4 | 450 | 84.9 | 10.00 | 5.00 | 0.10 | 0.00 | — | 0.00 | 15 | 420 | 400 | 5 |
| Example | 5 | 470 | 82.8 | 10.00 | 7.00 | 0.10 | 0.00 | Ni: 0.10 | 0.10 | 15 | 430 | 410 | 5 |
| Example | 6 | 500 | 79.0 | 10.00 | 10.00 | 1.00 | 0.00 | Sb: 0.05 | 0.05 | 15 | 430 | 410 | 5 |
| Comparative Example | 7 | 460 | 83.0 | 10.00 | 7.00 | 0.00 | 0.00 | — | 0.00 | 15 | 430 | 335 | 5 |
| Example | 8 | 460 | 85.8 | 11.00 | 3.00 | 0.00 | 0.20 | Ti: 0.01 | 0.01 | 15 | 400 | 380 | 5 |
| Example | 9 | 480 | 80.4 | 12.00 | 7.50 | 0.10 | 0.00 | — | 0.00 | 15 | 440 | 420 | 5 |
| Example | 10 | 540 | 71.5 | 12.00 | 15.00 | 1.50 | 0.00 | — | 0.00 | 20 | 440 | 420 | 5 |
| Example | 11 | 470 | 82.7 | 14.00 | 3.00 | 0.10 | 0.00 | Mn: 0.20 | 0.20 | 20 | 430 | 410 | 5 |
| Example | 12 | 470 | 78.9 | 14.00 | 7.00 | 0.10 | 0.00 | — | 0.00 | 20 | 430 | 410 | 5 |
| Example | 13 | 470 | 70.9 | 14.00 | 15.00 | 0.10 | 0.00 | — | 0.00 | 20 | 430 | 410 | 5 |
| Example | 14 | 480 | 76.4 | 16.00 | 7.50 | 0.10 | 0.00 | — | 0.00 | 20 | 440 | 420 | 5 |
| Example | 15 | 480 | 76.0 | 16.00 | 7.50 | 0.10 | 0.00 | Ni: 0.40 | 0.40 | 20 | 440 | 420 | 5 |
| Comparative Example | 16 | 480 | 74.9 | 18.00 | 7.00 | 0.10 | 0.00 | — | 0.00 | 20 | 440 | 335 | 5 |
| Comparative Example | 17 | 480 | 74.9 | 18.00 | 7.00 | 0.10 | 0.00 | — | 0.00 | 5 | 440 | 420 | 5 |
| Comparative Example | 18 | 480 | 74.9 | 18.00 | 7.00 | 0.10 | 0.00 | — | 0.00 | 20 | 440 | 420 | 20 |
| Example | 19 | 480 | 78.7 | 18.00 | 3.00 | 0.10 | 0.20 | — | 0.00 | 20 | 440 | 420 | 5 |
| Example | 20 | 480 | 74.4 | 18.00 | 7.50 | 0.10 | 0.00 | Ti: 0.01 | 0.01 | 20 | 440 | 420 | 5 |
| Example | 21 | 480 | 66.9 | 18.00 | 15.00 | 0.10 | 0.00 | — | 0.00 | 20 | 440 | 420 | 5 |
| Example | 22 | 500 | 76.4 | 20.00 | 3.00 | 0.10 | 0.00 | Fe: 0.50 | 0.50 | 20 | 415 | 395 | 5 |
| Example | 23 | 500 | 72.5 | 20.00 | 7.50 | 0.00 | 0.00 | — | 0.00 | 20 | 460 | 440 | 5 |
| Example | 24 | 540 | 72.4 | 20.00 | 7.50 | 0.10 | 0.00 | Pb: 0.02 | 0.02 | 20 | 460 | 440 | 5 |
| Example | 25 | 510 | 64.8 | 20.00 | 15.00 | 0.10 | 0.10 | — | 0.00 | 20 | 470 | 450 | 5 |
| Example | 26 | 510 | 69.9 | 22.00 | 8.00 | 0.10 | 0.00 | Sn: 0.02 | 0.02 | 20 | 470 | 450 | 5 |
| Example | 27 | 510 | 69.6 | 22.00 | 8.00 | 0.20 | 0.20 | — | 0.00 | 20 | 470 | 450 | 5 |
| Comparative Example | 28 | 510 | 69.8 | 22.00 | 8.00 | 0.20 | 0.00 | — | 0.00 | 20 | 470 | 335 | 5 |
| Comparative Example | 29 | 510 | 69.8 | 22.00 | 8.00 | 0.20 | 0.00 | — | 0.00 | 5 | 470 | 450 | 5 |
| Comparative Example | 30 | 510 | 69.8 | 22.00 | 8.00 | 0.20 | 0.00 | — | 0.00 | 20 | 470 | 450 | 20 |
| Comparative Example | 31 | 510 | 67.5 | 22.00 | 8.00 | 2.50 | 0.00 | — | 0.00 | 20 | 470 | 450 | 5 |
| Comparative Example | 32 | 510 | 67.6 | 22.00 | 8.00 | 0.20 | 2.20 | — | 0.00 | 20 | 470 | 450 | 5 |
| Example | 33 | 515 | 67.9 | 24.00 | 8.00 | 0.10 | 0.00 | — | 0.00 | 20 | 470 | 450 | 5 |
| Example | 34 | 515 | 67.8 | 24.00 | 8.00 | 0.10 | 0.00 | Mn: 0.10 | 0.10 | 20 | 470 | 450 | 5 |
| Example | 35 | 510 | 65.9 | 26.00 | 8.00 | 0.10 | 0.00 | — | 0.00 | 20 | 475 | 455 | 5 |
| Comparative Example | 36 | 510 | 56.8 | 27.00 | 16.00 | 0.20 | 0.00 | — | 0.00 | 20 | 475 | 455 | 5 |
| Comparative Example | 37 | 510 | 64.8 | 27.00 | 8.00 | 0.20 | 0.00 | — | 0.00 | 20 | 475 | 455 | 20 |
| Example | 38 | 510 | 63.8 | 28.00 | 8.00 | 0.10 | 0.10 | — | 0.00 | 20 | 475 | 455 | 5 |
| Example | 39 | 510 | 63.7 | 28.00 | 8.00 | 0.10 | 0.20 | — | 0.00 | 20 | 475 | 455 | 5 |
| Example | 40 | 510 | 66.6 | 30.00 | 3.00 | 0.10 | 0.30 | — | 0.00 | 20 | 435 | 415 | 5 |
| Example | 41 | 510 | 61.6 | 30.00 | 7.00 | 0.10 | 0.30 | Cu: 1.00 | 1.00 | 20 | 480 | 460 | 5 |
| Example | 42 | 510 | 54.3 | 30.00 | 15.00 | 0.10 | 0.60 | — | 0.00 | 20 | 480 | 460 | 5 |
| Example | 43 | 520 | 60.3 | 32.00 | 7.00 | 0.10 | 0.60 | — | 0.00 | 20 | 490 | 470 | 5 |
| Example | 44 | 520 | 60.3 | 32.00 | 7.00 | 0.10 | 0.60 | Sr: 0.02 | 0.02 | 20 | 490 | 470 | 5 |
| Example | 45 | 520 | 62.1 | 34.00 | 3.00 | 0.10 | 0.80 | — | 0.00 | 20 | 490 | 470 | 5 |
| Example | 46 | 520 | 58.1 | 34.00 | 7.00 | 0.10 | 0.80 | — | 0.00 | 20 | 490 | 470 | 5 |
| Example | 47 | 540 | 49.9 | 34.00 | 15.00 | 0.10 | 1.00 | — | 0.00 | 20 | 490 | 470 | 5 |
| Example | 48 | 540 | 57.4 | 34.00 | 7.00 | 0.10 | 1.50 | — | 0.00 | 20 | 500 | 480 | 5 |
| Example | 49 | 540 | 55.9 | 35.00 | 7.00 | 0.10 | 2.00 | — | 0.00 | 20 | 500 | 480 | 5 |
| Comparative Example | 50 | 580 | 55.8 | 37.00 | 7.00 | 0.20 | 0.00 | — | 0.00 | 20 | 510 | 490 | 5 |

TABLE 1-continued

| | | | Plating Layer Composition (mass %) | | | | | | | Controlled Cooling | | | Slow Cooling |
|---|---|---|---|---|---|---|---|---|---|---|---|---|---|
| | | Plating Bath Temperature (° C.) | | | | | | Other Elements | | Average Cooling Rate from Bath Temperature to Controlled Cooling Stop Temperature (° C./sec) | Binary Eutectic Temperature (° C.) | Controlled Cooling Stop Temperature | Cooling Average Cooling Rate from Controlled Cooling Stop Temperature to 335° C. (° C./sec) |
| Classification | No. | | Zn | Al | Mg | Ca | Si | Main Element (Content %) | Total % | | | | |
| Comparative Example | 51 | 480 | 74.9 | 18.00 | 4.00 | 0.10 | 0.00 | — | 0.00 | 20 | 440 | 300 | — |
| Comparative Example | 52 | Commercially Available Galvanized Steel Sheet | | | | | | | | | | | |
| | 53 | Commercially Available Alloyed Galvanized Steel Sheet | | | | | | | | | | | |
| | 54 | Commercially Available Electrogalvanized Steel Sheet | | | | | | | | | | | |

TABLE 2

| | | Plating Layer | | | | | | | | | Evaluation Result Post-Coating Corrosion Resistance | |
|---|---|---|---|---|---|---|---|---|---|---|---|---|
| | | (Al—Zn)/MgZn2 Lamellar Structure | | Massive | | Zn/Al/MgZn2 Ternary | Mg2Si Phase | | Other | Alloy | Internally Oxidized | |
| | | Lamellar Area % | Spacing (nm) | MgZn2 Phase Area % | (Al—Zn) Dendrite Area % | Eutectic Structure Area % | Circle Equivalent Diameter (μm) | Area % | Intermetallic Compounds Area % | Layer Thickness (μm) | Layer Thickness (μm) | Red Rust | Coating Blistering |
| Classification | No. | | | | | | | | | | | | |
| Comparative Example | 1 | 7 | 480 | 15 | 10 | 68 | — | 0.0 | 0.0 | 0.30 | 1.10 | A | B |
| Comparative Example | 2 | 8 | 480 | 13 | 12 | 67 | — | 0.0 | 0.0 | 0.30 | 1.20 | A | B |
| Example | 3 | 10 | 500 | 11 | 16 | 63 | — | 0.0 | 0.0 | 0.10 | 1.50 | A | A |
| Example | 4 | 11 | 500 | 12 | 0 | 77 | — | 0.0 | 0.0 | 0.10 | 2.00 | A | A |
| Example | 5 | 13 | 480 | 11 | 0 | 76 | — | 0.0 | 0.0 | 0.10 | 2.00 | A | A |
| Example | 6 | 15 | 480 | 22 | 0 | 63 | — | 0.0 | 0.0 | 0.20 | 1.50 | A | A |
| Comparative Example | 7 | 2 | 450 | 20 | 11 | 67 | — | 0.0 | 0.0 | 0.20 | 2.00 | B | B |
| Example | 8 | 15 | 500 | 12 | 28 | 45 | — | 0.0 | 0.4 | 0.20 | 1.00 | AA | A |
| Example | 9 | 26 | 480 | 15 | 4 | 53 | — | 0.0 | 2.1 | 0.20 | 1.90 | AA | A |
| Example | 10 | 24 | 470 | 32 | 0 | 44 | — | 0.0 | 0.0 | 0.10 | 2.00 | AA | A |
| Example | 11 | 25 | 300 | 10 | 29 | 36 | — | 0.0 | 0.2 | 0.20 | 1.40 | AA | A |
| Example | 12 | 41 | 480 | 10 | 2 | 47 | — | 0.0 | 0.0 | 0.20 | 2.00 | AA | A |
| Example | 13 | 43 | 490 | 29 | 4 | 24 | — | 0.0 | 0.0 | 0.30 | 2.00 | AA | A |
| Example | 14 | 70 | 500 | 10 | 2 | 18 | — | 0.0 | 0.0 | 0.20 | 1.50 | AA | AA |
| Example | 15 | 71 | 480 | 8 | 0 | 21 | — | 0.0 | 0.5 | 0.20 | 2.10 | AA | AA |
| Comparative Example | 16 | 4 | 450 | 30 | 36 | 30 | — | 0.0 | 0.0 | 0.20 | 2.10 | B | B |
| Comparative Example | 17 | 3 | 480 | 29 | 37 | 31 | — | 0.0 | 0.0 | 0.20 | 2.20 | B | B |
| Comparative Example | 18 | 4 | 410 | 30 | 34 | 32 | — | 0.0 | 0.0 | 0.20 | 2.00 | A | B |
| Example | 19 | 33 | 490 | 5 | 35 | 23 | 1.9 | 4.0 | 0.0 | 0.20 | 2.00 | A | A |
| Example | 20 | 83 | 470 | 16 | 0 | 0 | — | 0.0 | 0.7 | 0.20 | 2.00 | AA | AA |
| Example | 21 | 48 | 430 | 33 | 15 | 4 | — | 0.0 | 0.0 | 0.20 | 2.00 | A | A |
| Example | 22 | 44 | 410 | 0 | 33 | 23 | — | 0.0 | 0.0 | 0.20 | 1.90 | A | A |
| Example | 23 | 68 | 380 | 18 | 14 | 0 | — | 0.0 | 0.0 | 0.20 | 1.20 | AA | A |
| Example | 24 | 82 | 490 | 13 | 5 | 0 | — | 0.0 | 0.2 | 0.20 | 1.10 | AA | AA |
| Example | 25 | 72 | 450 | 20 | 8 | 0 | — | 0.0 | 0.0 | 0.20 | 1.30 | A | A |
| Example | 26 | 82 | 410 | 15 | 3 | 0 | — | 0.0 | 0.2 | 0.20 | 1.40 | AA | AA |
| Example | 27 | 80 | 410 | 20 | 0 | 0 | — | 0.0 | 0.0 | 0.20 | 1.50 | AA | AA |
| Comparative Example | 28 | 5 | 410 | 29 | 40 | 26 | — | 0.0 | 0.0 | 0.20 | 2.20 | B | B |
| Comparative Example | 29 | 3 | 450 | 29 | 42 | 26 | — | 0.0 | 0.0 | 0.20 | 1.90 | B | B |
| Comparative Example | 30 | 5 | 420 | 28 | 36 | 31 | — | 0.0 | 0.0 | 0.20 | 1.50 | B | B |
| Comparative Example | 31 | 9 | 430 | 29 | 39 | 12 | — | 0.0 | 11.0 | 0.20 | 1.60 | B | B |

TABLE 2-continued

| Classification | No. | Plating Layer | | | | | | | | | Evaluation | |
|---|---|---|---|---|---|---|---|---|---|---|---|---|
| | | (Al—Zn)/MgZn2 Lamellar Structure | | Massive | | Zn/Al/ MgZn2 Ternary Eutectic Structure Area % | Mg2Si Phase | | Other Intermetallic Compounds Area % | Alloy Layer Thickness (μm) | Internally Oxidized Layer Thickness (μm) | Result Post-Coating Corrosion Resistance | |
| | | Area % | Spacing (nm) | Lamellar MgZn2 Phase Area % | (Al—Zn) Dendrite Area % | | Circle Equivalent Diameter (μm) | Area % | | | | Red Rust | Coating Blistering |
| Comparative Example | 32 | 8 | 440 | 30 | 44 | 5 | 2.1 | 13.0 | 0.0 | 0.20 | 1.70 | B | B |
| Example | 33 | 81 | 430 | 15 | 4 | 0 | — | 0.0 | 0.0 | 0.20 | 1.20 | AA | AA |
| Example | 34 | 82 | 480 | 11 | 7 | 0 | — | 0.0 | 0.4 | 0.20 | 1.30 | AA | AA |
| Example | 35 | 83 | 420 | 13 | 4 | 0 | — | 0.0 | 0.0 | 0.20 | 1.90 | AA | AA |
| Comparative Example | 36 | 8 | 420 | 39 | 36 | 6 | — | 0.0 | 11.0 | 0.20 | 1.70 | B | B |
| Comparative Example | 37 | 2 | 410 | 29 | 44 | 25 | — | 0.0 | 0.0 | 0.20 | 1.80 | B | B |
| Example | 38 | 44 | 460 | 28 | 28 | 0 | — | 0.0 | 0.0 | 0.20 | 2.10 | A | A |
| Example | 39 | 70 | 480 | 19 | 11 | 0 | — | 0.0 | 0.0 | 0.20 | 2.50 | AA | AA |
| Example | 40 | 51 | 410 | 0 | 30 | 19 | — | 0.0 | 0.1 | 0.20 | 3.40 | A | AA |
| Example | 41 | 72 | 420 | 18 | 10 | 0 | — | 0.0 | 0.0 | 0.20 | 2.10 | AA | AA |
| Example | 42 | 62 | 480 | 38 | 0 | 0 | — | 0.0 | 0.0 | 0.20 | 2.50 | AA | A |
| Example | 43 | 64 | 430 | 11 | 25 | 0 | — | 0.0 | 0.0 | 0.20 | 2.10 | A | A |
| Example | 44 | 63 | 480 | 13 | 24 | 0 | — | 0.0 | 0.1 | 0.20 | 2.60 | A | A |
| Example | 45 | 48 | 410 | 0 | 34 | 18 | — | 0.0 | 0.0 | 0.20 | 2.10 | A | A |
| Example | 46 | 49 | 410 | 0 | 35 | 16 | — | 0.0 | 0.0 | 0.20 | 1.10 | A | A |
| Example | 47 | 49 | 400 | 39 | 12 | 0 | — | 0.0 | 0.0 | 0.20 | 0.70 | A | A |
| Example | 48 | 48 | 200 | 13 | 35 | 0 | 1.1 | 4.0 | 0.0 | 0.20 | 1.50 | A | A |
| Example | 49 | 45 | 210 | 15 | 32 | 0 | 1.6 | 8.0 | 0.0 | 0.20 | 2.10 | A | A |
| Comparative Example | 50 | 32 | 200 | 8 | 37 | 23 | — | 0.0 | 0.0 | 0.20 | 1.30 | A | B |
| Comparative Example | 51 | 3 | 410 | 29 | 38 | 30 | — | 0.0 | 0.0 | 0.20 | 2.00 | A | B |
| Comparative Example | 52 | Commercially Available Galvanized Steel Sheet | | | | | | | | | | B | B |
| | 53 | Commercially Available Alloyed Galvanized Steel Sheet | | | | | | | | | | C | B |
| | 54 | Commercially Available Electrogalvanized Steel Sheet | | | | | | | | | | B | B |

As can be seen from the results of Tables 1 and 2, in Examples prepared from the predetermined plating bath composition under appropriate cooling conditions, the area ratio of the feathery structure formed of the lamellar structure in which the (Al—Zn) phase and the MgZn2 phase were arranged in layers was 10% to 90%, the lamellar spacing of the lamellar structure was 2.5 μm (2500 nm) or less, and the area ratio of the (Al—Zn) dendrite was 35% or less. In addition, the results show that post-coating corrosion resistance was excellent.

On the other hand, in Comparative Examples prepared with an inappropriate plating bath composition or under inappropriate cooling conditions, the composition of the plating layer was outside of the present invention, and post-coating corrosion resistance was poor.

Example 2

Regarding Tests No. 3 to 6, 8 to 15, 19 to 27, 33 to 35, and 38 to 49, LME resistance was evaluated.

Specifically, a sample of 200 mm×20 mm was collected from the plated steel sheet and was provided for a hot tensile test, and a stress-strain curve at 800° C. was measured. In the hot tensile test, a tension rate was 5 mm/min, the chuck-to-chuck distance was 112.5 mm, and the strain amount was measured until the maximum stress was reached in the obtained stress-strain curve. A case where the strain amount was 85% or more with respect to a steel sheet sample on which plating was not performed was evaluated as "AA", and a case where the strain amount was 70% to 80% with respect to a steel sheet sample on which plating was not performed was evaluated as "A".

The results are shown in Table 3.

As can be seen from Table 3, although all of Examples have a certain level of LME resistance, in particular, in Examples where the area ratio of the lamellar structure was 70% or more, LME resistance was higher.

TABLE 3

| Classification | No. | LME Resistance |
|---|---|---|
| Example | 3 | A |
| Example | 4 | A |
| Example | 5 | A |
| Example | 6 | A |
| Example | 8 | A |
| Example | 9 | A |
| Example | 10 | A |
| Example | 11 | A |
| Example | 12 | A |
| Example | 13 | A |
| Example | 14 | AA |
| Example | 15 | AA |
| Example | 19 | A |
| Example | 20 | AA |
| Example | 21 | A |
| Example | 22 | AA |
| Example | 23 | A |
| Example | 24 | AA |
| Example | 25 | AA |
| Example | 26 | AA |
| Example | 27 | AA |
| Example | 33 | AA |
| Example | 34 | AA |

TABLE 3-continued

| Classification | No. | LME Resistance |
|---|---|---|
| Example | 35 | AA |
| Example | 38 | A |
| Example | 39 | AA |
| Example | 40 | A |
| Example | 41 | AA |
| Example | 42 | A |
| Example | 43 | A |
| Example | 44 | A |
| Example | 45 | A |
| Example | 46 | A |
| Example | 47 | A |
| Example | 48 | A |
| Example | 49 | A |

BRIEF DESCRIPTION OF THE REFERENCE SYMBOLS

1: steel sheet
2: plating layer
3: alloy layer
11: internally oxidized layer
21: lamellar structure of (Al—Zn) Phase (in the drawing, black) and MgZn$_2$ phase
22: massive MgZn$_2$ phase
23: (Al—Zn) dendrite
24: Zn/Al/MgZn$_2$ ternary eutectic structure

What is claimed is:

1. A plated steel sheet comprising:
a steel sheet; and
a plating layer that is formed on at least a part of a surface of the steel sheet,
wherein a chemical composition of the plating layer includes, by mass %,
Al: more than 5.00% and 35.00% or less,
Mg: 3.00% to 15.00%,
Si: 0% to 2.00%,
Ca: 0% to 2.00%, and
a remainder of Zn and impurities,
in a cross section of the plating layer in a thickness direction,
an area ratio of a lamellar structure in which an (Al—Zn) phase and a MgZn$_2$ phase are arranged in layers is 10% to 90%,
a lamellar spacing of the lamellar structure is 2.5 μm or less, and
an area ratio of an (Al—Zn) dendrite is 35% or less.

2. The plated steel sheet according to claim 1,
wherein the chemical composition of the plating layer includes, by mass %, one or more kinds of
Al: 11.00% to 30.00%,
Mg: 3.00% to 11.00%, and
Ca: 0.03% to 1.00%.

3. The plated steel sheet according to claim 2, wherein the chemical composition of the plating layer further includes, by mass %:
Sb: 0.50% or less;
Pb: 0.50% or less;
Cu: 1.00% or less;
Sn: 1.00% or less;
Ti: 1.00% or less;
Sr: 0.50% or less;
Ni: 1.00% or less;
Mn: 1.00% or less; and
Fe: 2.00% or less.

4. The plated steel sheet according to claim 2,
wherein in the cross section of the plating layer in the thickness direction, the area ratio of the lamellar structure is 50% to 90%.

5. The plated steel sheet according to claim 2, further comprising an alloy layer that is provided between the plating layer and the steel sheet and is formed of an Al—Fe-based intermetallic compound having an average thickness of 0.05 μm to 3.0 μm.

6. The plated steel sheet according to claim 2,
wherein the steel sheet includes an internally oxidized layer that is provided in a surface layer area on an interface side between the steel sheet and the plating layer.

7. The plated steel sheet according to claim 1, wherein the chemical composition of the plating layer further includes, by mass %:
Sb: 0.50% or less;
Pb: 0.50% or less;
Cu: 1.00% or less;
Sn: 1.00% or less;
Ti: 1.00% or less;
Sr: 0.50% or less;
Ni: 1.00% or less;
Mn: 1.00% or less; and
Fe: 2.00% or less.

8. The plated steel sheet according to claim 7,
wherein in the cross section of the plating layer in the thickness direction, the area ratio of the lamellar structure is 50% to 90%.

9. The plated steel sheet according to claim 7, further comprising an alloy layer that is provided between the plating layer and the steel sheet and is formed of an Al—Fe-based intermetallic compound having an average thickness of 0.05 μm to 3.0 μm.

10. The plated steel sheet according to claim 7,
wherein the steel sheet includes an internally oxidized layer that is provided in a surface layer area on an interface side between the steel sheet and the plating layer.

11. The plated steel sheet according to claim 1,
wherein in the cross section of the plating layer in the thickness direction, the area ratio of the lamellar structure is 50% to 90%.

12. The plated steel sheet according to claim 11,
wherein in the cross section of the plating layer in the thickness direction, the area ratio of the lamellar structure is 70% to 90%.

13. The plated steel sheet according to claim 12, further comprising an alloy layer that is provided between the plating layer and the steel sheet and is formed of an Al—Fe-based intermetallic compound having an average thickness of 0.05 μm to 3.0 μm.

14. The plated steel sheet according to claim 12,
wherein the steel sheet includes an internally oxidized layer that is provided in a surface layer area on an interface side between the steel sheet and the plating layer.

15. The plated steel sheet according to claim 11, further comprising an alloy layer that is provided between the plating layer and the steel sheet and is formed of an Al—Fe-based intermetallic compound having an average thickness of 0.05 μm to 3.0 μm.

16. The plated steel sheet according to claim 11,
wherein the steel sheet includes an internally oxidized layer that is provided in a surface layer area on an interface side between the steel sheet and the plating layer.

17. The plated steel sheet according to claim 1, further comprising an alloy layer that is provided between the plating layer and the steel sheet and is formed of an Al—Fe-based intermetallic compound having an average thickness of 0.05 μm to 3.0 μm.

18. The plated steel sheet according to claim 17,
wherein the steel sheet includes an internally oxidized layer that is provided in a surface layer area on an interface side between the steel sheet and the alloy layer.

19. The plated steel sheet according to claim 1,
wherein the steel sheet includes an internally oxidized layer that is provided in a surface layer area on an interface side between the steel sheet and the plating layer.

\* \* \* \* \*